Figure 1:
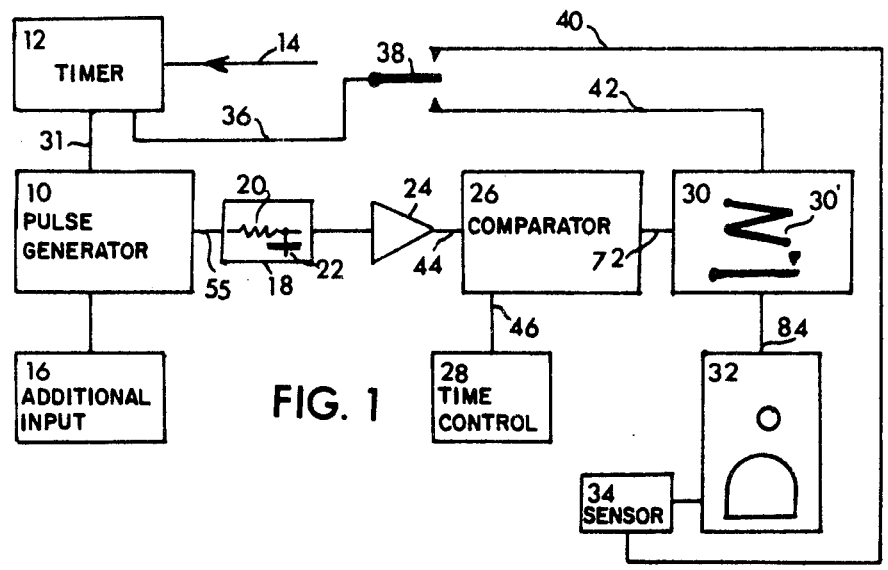

United States Patent [19]
Claesson et al.

[11] 4,412,649
[45] Nov. 1, 1983

[54] ARRANGEMENT IN CLIMATIZATION SYSTEMS

[75] Inventors: Kjell Claesson, Huddinge; Stig Rönnerholm, Handen; Rolf Strand, Huddinge, all of Sweden

[73] Assignee: Tour & Andersson Aktiebolag, Stockholm, Sweden

[21] Appl. No.: 365,475

[22] Filed: Apr. 5, 1982

[30] Foreign Application Priority Data

Jun. 12, 1981 [SE] Sweden ................................ 8103698

[51] Int. Cl.³ .......................... F23N 5/20; H03K 5/00
[52] U.S. Cl. ................................... 236/46 R; 307/261; 328/185
[58] Field of Search ...................... 236/46 R, 47, 46 F; 165/12; 307/227, 261, 228; 328/35, 184, 181, 185

[56] References Cited
U.S. PATENT DOCUMENTS

| | | | |
|---|---|---|---|
| 3,465,257 | 9/1969 | Currie et al. | 328/35 X |
| 3,740,588 | 6/1973 | Stratton et al. | 307/228 X |
| 3,747,396 | 7/1973 | O'Neill | 328/184 X |
| 3,964,676 | 6/1976 | Rooks et al. | 236/46 R |

*Primary Examiner*—William E. Wayner
*Attorney, Agent, or Firm*—Larson and Taylor

[57] ABSTRACT

In a climatization system the influence of the outside air temperature is fed to a comparator which is also fed with a comparation voltage, successively variable during the starting time and obtained from a pulse generator of variable pulse-time-relation, and the climatization process is started at a balance point between the two voltages.

10 Claims, 5 Drawing Figures

ARRANGEMENT IN CLIMATIZATION SYSTEMS

In systems for climatization within buildings and the like it has been proposed that one should not only take in account the temperature of the air inside of the building but also the temperature of the outside air.

In this connection, by the conception "climatization" is understood heating, cooling and ventilation as well as two or more of these circumstances in combination. Independently of whether the climatization regards heating or cooling, it should, thus, be dependent upon the temperature in the interior of the building but also, to some extent, upon the temperature of the atmosphere outside of the building. Thereby, however, it should be observed that these two temperatures act in mutually different ways.

If, for instance, the inside temperature is so low that it cannot be regarded comfortable, it should be increased by the amount of difference between the temperature proper and the desired, comfortable temperature. This increase of temperature, however, is counteracted by low temperature of the atmosphere outside of the building whereas it is supported by a high temperature of same atmosphere. Assuming that the run of of the heating of the localities forms a linear function with time, then the retardation or acceleration of the process caused by the outside temperature, would be close to the first derivative with time of the first mentioned function. This has caused complications.

Further, one has for the purpose of saving power proposed, during nights, week ends or the like completely or in part to shut off the climatization of such localities in which no people are living or active during the said periods of time, in order, thereafter, to start the climatization process at such a time before the localities being taken into use again that comfortable conditions will exist when the localities are take into use again. The time required for establishing the said comfortable conditions, the "starting time", must as evident from the above not only be dependent upon the inside temperature but also upon the outside temperature. The first one is composed by the temperature of the air in the localities of the building, which has a rather small heat capacity, and by the temperature of solid objects such as internal walls, furniture and the like having an essentially greater heat capacity and, therefore being heated at a slower rate. This has also caused complications.

The said complications have caused that the climatization systems hitherto proposed have been very complicated and, thereby, also expensive as well as sensitive to disturbances of many different types. Thus, there is a need for a climatization system, which will, perhaps, not function with a maximum accuracy but, nevertheless, with an acceptable accuracy for use in smaller buildings or in buildings such as storage localities or the like, where no excessive demands on accuracy are raised but, instead, is of a simple construction, and is cheap in supply and support and is reliable in operation.

The present invention regards an arrangement in such a climatization system, which does not prevent, of course, that the invention may also advantageously be used in more complete climatization systems.

The invention, especially, regards the introduction of a control factor which is dependent upon the outside temperature, and it is based upon the principle that the starting time, which means the period of time between the starting of the climatization system and achieving the comfortable conditions, shall take place by successively changing the pulse-time relation in a train of pulses which is started before or at the beginning of starting time, further that the train of pulses shall be equalized so that a smaller voltage or current, below as a matter of simplification referred to as "voltage" shall be obtained the smaller the pulse-time-relation is and that, finally, this voltage shall be compared in a comparator with a "voltage" forming an expression for the outside temperature.

The invention, thus, regards an arrangement for starting or stopping, respectively, a climatization system, for instance a heating system for a space dependent upon at least the interior temperature proper of the space and the outside air temperature.

According to the invention the arrangement comprises a pulse generator for creating a train of pulses with a successively changed pulse-time-relation, said pulse train being fed to an equalization device and from this, in the form of a successively changed direct current voltage, at least approximately free of alternating voltage, to a comparator, which is also fed with a voltage from some means indicating the outside air temperature such that, when a state of balance is achieved between the two voltages, a signal is transmitted for starting the climatization process of the climatization system.

The invention, below, will be described in connection with an embodiment shown in the attached drawings but it is understood that the invention shall not be limited to this specific embodiment but that all different kinds of modifications may exist within the scope of the invention.

Figure 2:
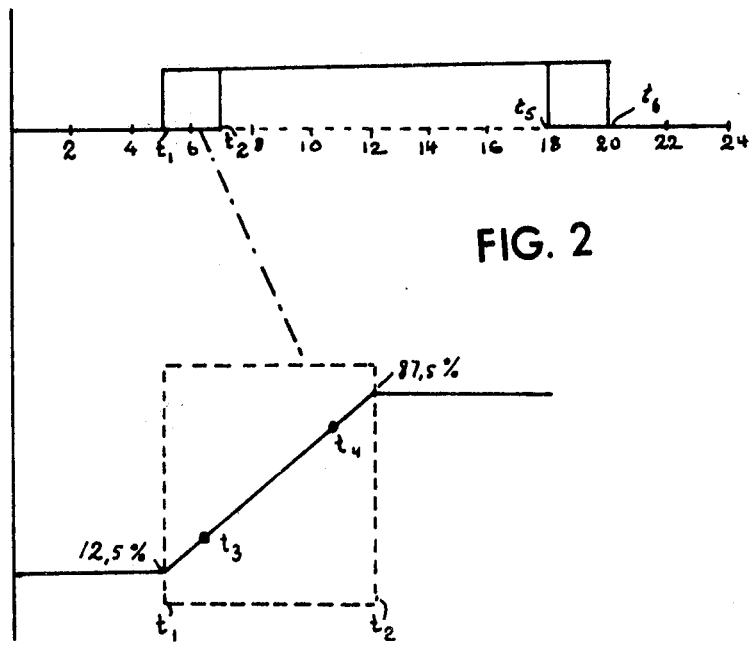

In the drawings,

FIG. 1 shows a block diagram in general terms of the complete arrangement, whereas FIG. 2 shows a time diagram for explaining the run of the procedure.

Figure 3:
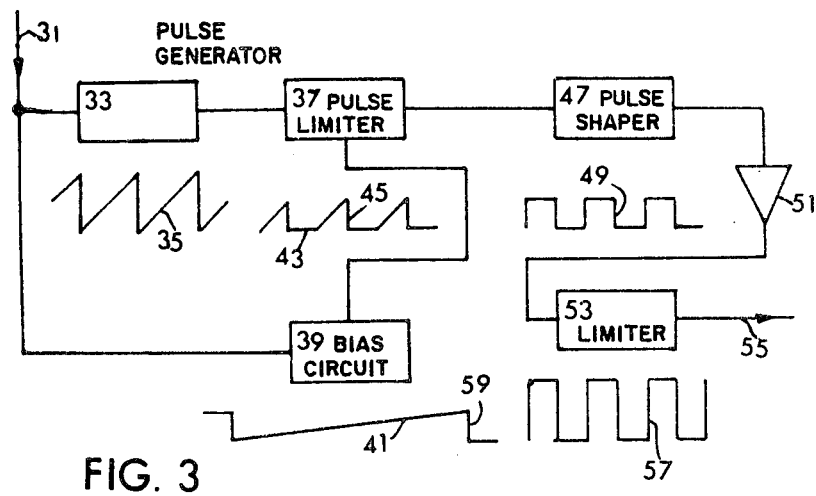
Figure 4:
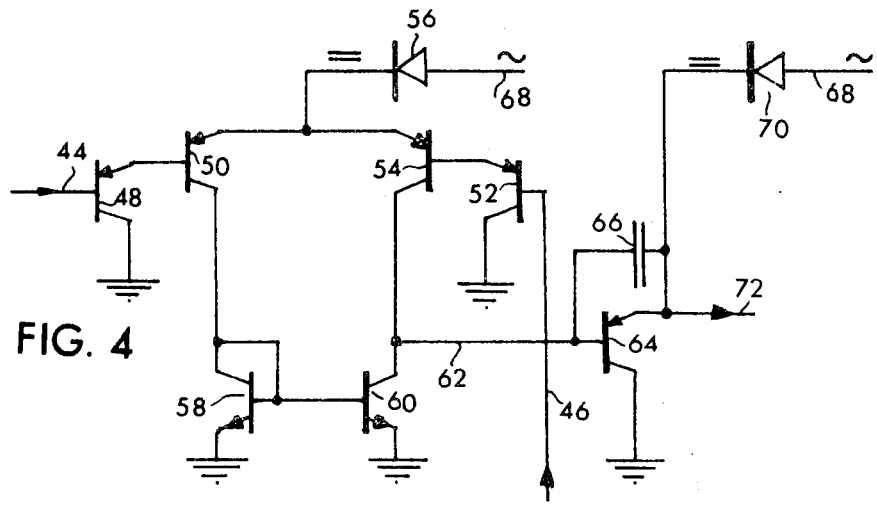
Figure 5:
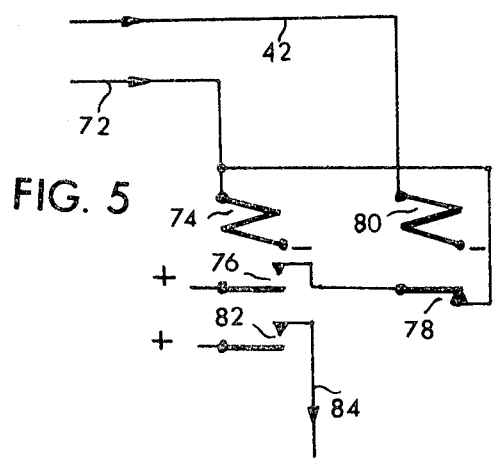

FIG. 3 shows a more detalied block diagram along with illustrations of different pulse shapes of the pulse generator part of the arrangement shown in FIG. 1, FIG. 4 shows a diagram of the comparator part of some arrangement, and FIG. 5, finally, shows a diagram of the starting device for the means causing the effective climatization, here shown as a heating vessel which is assumed to feed a heat radiator system of conventional type.

In FIG. 1, the pulse generator is of a type which will be further described below in connection with FIG. 3. The pulse generator is started from a timer 12, which is preferably adjustable. The possibility of adjustment, in FIG. 1, has been schematically indicated by means of a conduit 14. An arrangement 16 of some kind known per se may be provided for measuring the inside temperature or other circumstances which should be fed to the pulse generator for determining its function.

This arrangement, however, should only be regarded schematic. As a matter of fact, it is not of decisive importance to the present invention how the factor is introduced into the arrangement which is dependent upon the indoor temperature. It may be introduced over the conduit from the device 16, and this device may for instance be made in accordance with the DE-A-specification No. 2.617.165 but one may also introduce said factor into the arrangement in some other way such as over the conduit 14. In extremely simple cases, one may, based upon reading the internal temperature and upon obtained experience, state the correct moment of time for starting the arrangement and, in this way, introduce a factor dependent upon the interior temperature into the timer 12 for establishing its function.

The output circuit from the pulse generator 10 is connected to a filter 18 which may, in its most simple form, be made as an L-filter comprising a resistor 20 and a condensor 22, but, of course, also other filter constructions may be used. The output circuit continues from the filter 20 to an amplifier 24 and from this to a comparator 26 with two input circuits. One of the input circuits, thus, is formed by the connection from the amplifier 24, the other input circuit coming from a sensor means 28, for instance a thermistor with the amplifier pertaining thereto of a type known per se, said means giving off a voltage to the comparator 26 for indication of the outdoor temperature. This voltage, for practical reasons, should be in an order of magnitude, which is comparable with the magnitude of the voltage over the conduit from the amplifier 24.

The output circuit from the comparator 26 runs to the starter device 30 for the climatization process, said starter device usually comprising a relay 30'.

As a matter of simplification, it has been assumed in the embodiment now described that the climatization is intended for heating alone of a locality by means of a heating vessel 32 which feeds in the traditional way a system of heat radiators and the function of which is controlled from some device such as a thermostatically governed control arrangement which starts or stops the heating vessel, respectively, or changes the setting of a shunt valve, introduced into the feeder conduit for hot water to the radiators for variation of the temperature of the heat carrier medium or in some other way which does not form per se part of the present invention, takes care of maintenance of the comfortable temperature. The thermostat is schematically indicated at 34. It is known per se.

Thus, it is not of decisive importance to the present invention how the adjustment of the timer 12 takes place over the conduit 14. In an especially simple embodiment of the invention, this adjustment may take place by hand by some person, well aquainted with the function of the system and dependent upon the building technical matters, the indoor temperature and/or other circumstances so that the starting will take place at least approximately at a correct time $t_1$, see FIG. 2. This time $t_1$ should be positioned before the time $t_2$ at which the comfortable temperature should exist in the climatization controlled locality. At a more advanced embodiment of the invention, one may feed to the conduit 14 an electrically carried expression for different circumstances which are adapted to influence the suitable time for starting the climatization process, such as in addition to the indoor temperature also the existence of sun shine or rain or clouds, the wind pressure onto the outside walls of the locality and so on. To indicate the introduction of such circumstances, the block 16 has been shown in FIG. 1.

As evident from FIG. 2, the intention is that, in the shown embodiment, the comfortable temperature or other climatic conditions should exist within the locality from 7:00 to 18:00 o'clock, the starting period of time for instance running from 5:00 to 7:00 o'clock or beginning at some other time, indicated by the timer 12, whereas the shut off time should start at 18:00 o'clock and be ended at some other time, which may as indicated in FIG. 2, for instance be 20:00.

The pulse generator 10 transmits pulses of some suitable frequency. This may perhaps be variable but preferably the frequency should be constant and rather high. However, it is characteristic to the present invention that the pulse-time-relation is successively variable, as seen from the enlarged picture of the block from the time $t_1$ to the time $t_2$ shown below said block. The pulse-time-relation, by which is meant the part of each separate pulse period comprising an active pulse, in relation to the total of the pulse duration, thus, is variable. At the beginning of the starting time period, it may be of any preselected suitable low value and this has been indicated in FIG. 2 to be 12.5 which means that, in this chosen case, the active pulse comprises 12.5% of the pulse time period the pulse free part, the so called inter-pulse comprising 87,5% of the length of the pulse time period. The pulse-time-relation, thus, increases successively so that, at the time $t_2$, it is 87.5 which means that the duration of the pulse is 87.5% of the the period whereas the inter-pulse period is, instead, only 12.5% of same period.

A pulse equalization takes place in the filter 20. If this pulse equalization would be ideal which is scaroely possible in practice, then a pure D.C. current would exist in the output circuit from the filter 20. This is fed to the amplifier 24 and is, in amplified form, transmitted to one of the input circuits of the comparator 26. This voltage, thus, increases with time and if this variation with time takes place linearly, and also the pulse shape is rectangular, then the variation of the D.C. voltage fed to the comparator 26 will also be linear with time. It may then be assumed that the curve in the enlarged picture part of FIG. 2 will give an expression for the increase of the voltage concerned.

The invention, of course, may also be used with another shape of the pulses than the rectangular one, e.g. a parallel trapezoidal shape or a saw tooth shape but essential advantages are gained in the form of a constant sensitivity of the subsequent parts of the arrangement if the pulse shape is rectangular because the variation will then take place linearly over all of the variation range.

The output voltage from the amplifier 24 is compared in the comparator 26 with the voltage fed from the sensing means 26 for the outdoor temperature. Consequently, if the outdoor temperature is very cold, balance will exist in the comparator already at an early time of the feed of the equalized pulses from the amplifier 24, e.g. at the time $t_3$ in FIG. 2, but if the outdoor temperature is high, balance will exist only at a later time, e.g. at the time $t_4$. When a state of balance has been achieved the climatization is started which is shown in the chosen embodiment by means of a heater vessel 32, giving off heat to the locality to be climatized.

It will now be evident that one has, in this way, taken due regard to the greater and earlier need for heat for the climatization at cold outdoor weather, represented by the state of balance at the time $t_3$ and that the period of time available for heating will thus start earlier and have a longer duration whereas matters would be reversed at high outdoor weather.

When the starter relay 30' for the climatization attracts also the climatization means 32 will start and this means, thereby is controlled automatically by the sensor means 34. If the climatization means is a heater vessel 32, thus, the means 34 may be a thermostat in combination with adjustment means for the shunt valve of the vessel so that at a smaller need for heat water o a lower temperature is fed to the existing heat radiators and vice versa.

The arrangement now described is very simple and reliable in operation. In its most simple form it only comprises a manual adjustment possibility over the conduit 14 based upon experience of the person taking care of the system. This is completely sufficient in buildings which are rather small such as smaller villa buildings. The influence of the outdoor temperature then is effected in full by the means 28 which determines the starting time for the heater vessel 32 such that it is started earlier at cold outdoor weather and later at warm outdoor weather. Simultaneously, the arrangement is shaped such that it will at a small cost be completed for providing further functions fed over the means 16. They are then brought automatically to influence the control voltage in the conduit 14.

The timer 12 preferably also determines the time for shut-off of the climatization system which could, according to the above, for instance take place such that the locality is cold or anyhow has a temperature of less than the comfortable one at 20:00 o'clock in the evening. Regarding the existing heat capacity, however, the shut-off period may start already at an earlier time and, according to FIG. 2, this period of time starts at 18:00 o'clock using the arrangement already described, so that the shut-off is completed for instance at 20:00 o'clock. The two times 18:00 and 20:00, in FIG. 2, have been indicated by $t_5$ and $t_6$, respectively.

Of course, it is not necessary to have the shut-off of the climatization system take place dependent upon the outdoor temperature, even if this means a very simple step which is often advantageous. As it is assumed that the locality is not used during the period of time from $t_5$ or $t_6$ to $t_1$ or $t_2$, respectively, the shut-off of the climatization system could be effected directly from the timer 12 to the starter device 30 and, in this way, indirectly to the climatization means (heater vessel) 32. At very cold outdoor temperature, however, it may occur that during a rather long stop of work damages due to freezing could occur in the locality or in existing piping, especially during the week ends at wintertime. To avoid this, one may instead let the timer 12 influence the control device 34 such that the climatization means 32 will still work during the period of stand still, however thereby maintaining an essentially lower temperature, which is, nevertheless safe against damages due to freezing.

To satisfy the said desires, one may provide an output conduit 36 from the timer 12 to a switch 38 by means of which one can direct the signal from the timer 12 either over the conduit 40 to the control means 34 in order to adjust this for a lower "night temperature" in the locality, or, over the conduit 42 to the starter device 30 for the climatization in order to completely shut it off.

In FIG. 3, the pulse generator part is shown in block diagram. The different coupling arrangements represented by the blocks in this diagram are conventional and well known to the man skilled in the art and, therefore, no closer description of them would be necessary. The starting cinduit from the timer 12 is shown at 31 and is also marked in FIG. 1. It causes the starting of a conventional pulse generator 33 for creating saw tooth shaped pulses 35 which are carried on to a pulse limiter 37. The pulse limiter 37 is controlled by the bias creator 39 which is also started over the conduit 31 and may either be of such a type that it will create a successively increasing or a successively decreasing bias during the start period $t_1$–$t_2$. In FIG. 3, the bias is shown as sucessively increasing. The curve 41 for the bias, of course, is reproduced in an essentially compressed scale in relation to the scale for the pulses. The bias 41 is fed to the pulse limiter in such a way that the lower values 43 of the saw tooth pulses 35 will be cut away in a continuously increasing rate with the consequence that only the peaks 45 of the pulses will remain. It is then obvious that these peaks will have a constant frequency but a successively decreasing amplitude and duration of each separate pulse.

The pulses 45 are fed to a pulse shaper 47 of conventional type in which they are, without any change of the pulse frequency or the pulse duration re-shaped into rectangular pulses 49 which are, over an amplifier 51 fed to a limiter 53 so that one will get, in the output circuit 55 of the limiter which is also found in FIG. 1, a pulse train of the general type shown at 57. Thus, it should be observed that the pulse train has a constant frequency and, after amplification and limitation of the amplitude, a constant amplitude, but it has a variable duration of each pulse. With other words, the pulse-time relation is changed in time with the curve 41. The specific shape, which has been shown for the pulses 57 in the curve may be regarded representative for the pulse shape at the end 59 of the curve 41.

FIG. 4 shows a preferred embodiment of the comparator 26. Thus, this one has two input conduits 44 and 46 which are also found in FIG. 1. Each of the input signals over the conduits 44 and 46 is amplified in this embodiment of the comparator by means of two transistors in cascade, viz., for the conduit 44 the transistors 48 and 50 and for the conduit 46 the transistors 52 and 54. They get their working voltage from the mains conductor 68 over a rectifier 56. For stabilization, the two groups of transistors 48–50 and 52–54, respectively, are grounded each over one transistor 58 and 60, respectively, and the starting voltage or difference voltage thus representing the voltage existing in the comparator 26 at the time $t_4$, see FIG. 2, then will also exist in the conduit 62. As this voltage may be assumed not to be sufficiently strong for the control purposes considered it is further amplified in a transistor amplifier 64 with de-coupling condenser 66 and the feed of voltage from the mains conductor 68 over the rectifier 70. The amplified output voltage, consequently, will exist in the conduit 72, which is also found in FIG. 1.

Now, it is evident that the comparator must not necessarily be of the transistor controlled type such as shown in FIG. 4 but it may also by of another type. Such a comparator which is extremely simple may comprise a Wheatstone bridge known per se in which a first resistor is fed with voltage from the conduit 44 and a second resistor with voltage from the conduit 46. Suitably, the bridge should be fed with D.C. current at two of its diagonal points and the output voltage to the conduit 72 should be collected between the two remaining diagonal points. Also this voltage, however, will normally be too weak for control of the means 30, and, therefore, it should be amplified which takes place, in this case, by the voltage being fed to an amplifier relay, the excited closed contact of which, in turn, feeds voltage to the control means 30.

FIG. 5 shows an example of a relay control which could, of course, also be made as a transistor control or as any other kind of control. FIG. 5, however, intends to explain the function of the means 30.

The input conduit 72, here, runs to a first relay, the closing relay 74, which is made as a self latching relay. Thus, it posesses a contact 76 which is closed when voltage is fed to the winding of the relay 74 and closes, thereby, a self latching circuit from the pulse terminal over the release relay 80 for the input end if the relay winding 74 so that this relay will remain attracted as long as the release relay 80 does not get voltage. The closing relay 74 delivers voltage, over its attracted contact 82 to the conduit 84 running to the climatization means (heating vessel) 32 and causing start of same.

When the timer indicates that the climatization means 30 shall no longer be working, voltage is fed, over the conduit 42 which causes attraction of the release relay 80 which, thereby, opens the self latching circuit 78 for the closing relay 74 so that this relay will, in turn, fall and open the work indication circuit 84 to the climatization means 30.

A similar arrangement may be connected to the control means 34 for causing instead, a control for decreased indoor temperature during the period of standstill. The man skilled in the art will immediately understand how this arrangement should be constructed.

We claim:

1. An arrangement for starting and stopping, respectively, a climatization system, e.g. a heating system for a locality, dependent upon, at least, the interior temperature proper of the locality and the out door temperature, characterized thereby that said arrangement comprises a pulse generator for creating pulses forming a pulse train of successively changed pulse-time-relation, said train of pulses being fed to an equalization device and from this, in the form of a successively changed, preferably D.C. voltage which is at least approximately free from A.C. components, to a comparator which is also fed with a voltage from a means indicating the outdoor temperature so that when a state of balance is obtained between the two voltages, a signal is transmitted for starting the climatization system.

2. An arrangement according to claim 1, characterized thereby that the pulse generator is arranged to be started from a preferably adjustable timer.

3. An arrangement according to claim 2, characterized thereby that the timer is arranged, also directly or indirectly, over a release device to give a signal to the climatization means for de-coupling same.

4. An arrangement according to any one of claims 1–3 characterized thereby that the equalization device comprises a filter, such as a L-filter with resistor and condensor.

5. An arrangement according to any of claims 1 to 3, characterized thereby that the pulse generator is arranged to provide rectangular pulses.

6. An arrangement according to any of claims 1 to 3, characterized thereby that the pulse generator (1) is arranged to provide pulses, the pulse-time-relation of which vary along a scale, linear with time.

7. An arrangement according to claim 3, characterized thereby that the release conduit is arranged to re-arrange a control means for the climatization means to provide less power during given periods of time and to provide higher power during other periods of time.

8. An arrangement according to claim 3, characterized thereby that the release conduit is arranged completely to shut off the function of the climatization means during given periods of time.

9. An arrangement according to claim 7, characterized thereby that a switch is provided to put either one of the two release conduits in function or out of function.

10. An arrangement according to claim 8, characterized thereby that a switch is provided to put either one of the two release conduits in function or out of function.

* * * * *